UNITED STATES PATENT OFFICE 2,571,515

PROCESS OF PREPARING IODINATED AMINO BENZOYLAMINO ALKANOIC ACIDS

Sydney Archer, Albany, N. Y., assignor to Sterling Drug Inc., Wilmington, Del., a corporation of Delaware No Drawing. Application October 3, 1947, Serial No. 777,865

3 Claims. (Cl. 260—518)

This invention relates to certain N-substituted 4-amino-3,5-diiodobenzoylamino acids and to salts thereof.

These compounds are opaque to X-rays and are valuable as contrast media in roentgenological examinations of the gall bladder. They are definite and stable compounds, the halogen being firmly attached to the phenyl radical. The aromatic amino group appears to be particularly effective in causing ready absorption of the compound after oral administration and rapid concentration in the gall bladder, as well as rapid and facile elimination from the body.

My new compounds have the formula

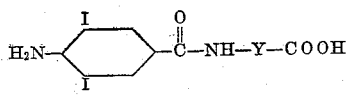

where Y is a hydrocarbon bridge of from 5 to 8 carbon atoms. The salts of these acids, particularly those which are water soluble, formed from therapeutically acceptable inorganic or organic bases, are also within the scope of the invention. Such therapeutically acceptable bases are those which do not of themselves, when in the form of cations, cause deleterious effects in the organism at dosage levels of the magnitude used for roentgenological visualization.

In these compounds, different portions of the molecule apparently produce different physiological effects. The diiodoaminophenylbenzoylamino moiety, common to all of the compounds, is apparently effective mainly in producing radiopacity, although it doubtless has a favorable influence upon the absorption and elimination of the substances and perhaps upon their concentration in the bile. However, the size of the remaining portion of the molecule, the aliphatic carboxylic acid radical, seems to largely determine the route of elimination. Apparently a carboxylic acid radical containing 6 or 7 carbon atoms is most effective in causing concentration in the gall bladder. If this radical contains fewer carbon atoms, an increasing tendency to pass through the kidneys is observed, so that the lower homologues of this series of compounds are urographic rather than cholecystographic agents. On the other hand the presence of a larger number of carbon atoms decreases absorption to such an extent that the compounds are largely eliminated through the gut.

The contrast agents which have been widely used up to the present time are not completely satisfactory. Tetraiodophenolphthalein frequently causes violent physiological reactions. 2-(4'-hydroxy-3',5'-diiodophenyl)-quinoline-4-carboxylic acid is much too toxic. Beta-(4-hydroxy-3,5-diiodophenyl)-alpha-phenylpropionic acid is better than the others but occasionally produces pain on urination, interferes with the rate of emptying of the gall bladder following a fatty meal, causes a burning sensation in the throat, or produces nausea, vomiting and diarrhea.

My compounds have an oral toxicity of the same order of magnitude as that of beta-(4-hydroxy-3,5-diiodophenyl)-alpha-phenylpropionic acid and produce cholecystographic pictures of an intensity at least equal to and in a number of cases greater than equivalent doses of this compound.

These compounds may be prepared in three steps starting with p-nitrobenzoyl chloride and an amino acid. These reactants condense in the presence of alkali (Schotten-Baumann method) to form an N-substituted p-nitrobenzoylamino acid. The nitro group is then reduced, preferably by catalytic hydrogenation, to an amino group to give an N-substituted p-aminobenzoylamino acid. The preferred catalyst is Raney nickel, however others such as platinum and palladium may be used. Reduction of the nitro group may also be achieved by use of chemical reagents which produce nascent hydrogen, such as iron and hydrochloric acid and zinc and sodium hydroxide. The final step comprises an iodination in which two iodine atoms are introduced in the two positions ortho to the amino group, as by the action of iodine monochloride in acetic or hydrochloric acid solution. Instead of iodine monochloride in acidic solution, elementary iodine can also be used as the iodinating agent.

The following examples will further illustrate my invention and demonstrate the generality of the reactions involved, without, however, limiting the scope of the invention thereto.

*Example 1*

(a) *N - (p-nitrobenzoyl) - norleucine.* — p-Nitrobenzoyl chloride (40 g.) is added to a solution of 26.2 g. of norleucine in 1 liter of 0.2 N sodium hydroxide over a period of one-half hour. Additional sodium hydroxide solution is then added to bring the solution to pH 10, and the mixture is stirred for two hours, filtered and acidified to congo red with hydrochloric acid. The amido-acid thereupon precipitates and is filtered, boiled with dilute hydrochloric acid to remove any unchanged amino acid and refiltered. Recrystallization from 300 cc. of 50% ethanol gives about 50 g. of p-nitrobenzoyl-norleucine, M. P. 167-168° C. Further recrystallization gives a sample with the M. P. 171-172° C.

(b) *N-(p-aminobenzoyl)-norleucine.*—A solution of 60 g. of p-nitrobenzoyl-norleucine in 300 cc. of methanol is shaken in an atmosphere of hydrogen at an initial pressure of 50 lbs. per sq. in. and at room temperature, using about five teaspoons of Raney nickel catalyst. After absorption of hydrogen has ceased, the catalyst is filtered, the methanol evaporated and the crystalline residue stirred with water, again filtered and air-dried. Recrystallization from ethyl acetate gives about 40 g. of p-aminobenzoyl-norleucine, M. P. 156-157° C.

(c) *2 - (4 - amino - 3,5 - diiodobenzamido) - hexanoic acid.*—A solution of 38 g. of p-aminobenzoyl-norleucine in 100 cc. of glacial acetic acid is heated to 70° C. Then 20 cc. of water is added followed gradually by 18 cc. of iodine monochloride dissolved in 80 cc. of glacial acetic acid. After stirring for about an hour longer, the mixture, containing the solid product in suspension, is cooled somewhat, and sulfur dioxide is bubbled through to effect decolorization. The product obtained by cooling and filtering is recrystallized two or three times from dilute acetic acid, using sodium hydrosulfite and activated charcoal for decolorizing, giving about 45 g. of 2-(4-amino-3,5-diiodo)-benzamidohexanoic acid, M. P. 184.5-185° C.

Example 2

(a) *6-(p-nitrobenzamido)-hexanoic acid.* — Caprolactam (2-keto-hexamethylenimine, 113 g.) is converted to the sodium salt of 6-amino-hexanoic acid by stirring with a solution of 52 g. of sodium hydroxide in 1 liter of water and heating on a steam bath for sixteen hours. The solution is cooled to 10° C. and 200 g. of p-nitrobenzoyl chloride is added in portions with stirring, the alkalinity being kept at pH 10 by the addition of more sodium hydroxide. After stirring for one-half hour, the excess p-nitrobenzoyl chloride is removed by filtration, and the solution acidified to congo red with hydrochloric acid. The precipitated product is filtered and recrystallized from dilute alcohol giving about 230 g. of 6-(p-nitrobenzamido)-hexanoic acid, M. P. 136° C.

(b) *6-(p-aminobenzamido)-hexanoic acid.* — Reduction of the above-described nitro compound (180 g. in 900 cc. of methanol) is carried out in a manner similar to that described in Example 1, part (b). The amino compound crystallizes from ethyl acetate, giving about 110 g. of 6-(p-aminobenzamido)-hexanoic acid, M. P. 128-130° C.

(c) 6 - (p - amino - 3,5 - diiodobenzamido) - hexanoic acid is prepared by iodination of the amino compound (116 g.) with iodine monochloride (45 cc.) in a manner similar to that described in Example 1. 6-(p-amino-3,5-diiodobenzamido)-hexanoic acid crystallizes from dilute acetic acid giving about 122 g., M. P. 165-167° C.

Example 3

(a) N - (p-nitrobenzoyl) - leucine is prepared from leucine (46 g.) and p-nitrobenzoyl chloride (70 g.) according to the method described in Example 1. About 83 g. of N-(p-nitrobenzoyl)-leucine is obtained with the M. P. 228-230° C.

(b) N-(p-aminobenzoyl)-leucine is prepared by reduction of the nitro compound (82.5 g. in 450 cc. of methanol) in the manner described in Example 1. About 50 g. of N-(p-aminobenzoyl)-leucine is obtained with the M. P. 185° C.

(c) 2 - (4 - amino-3,5 - diiodobenzamido)-4-methylpentanoic acid is prepared by iodination of N-(p-aminobenzoyl)-leucine (50 g.) with iodine monochloride (27 cc., 81 g.) according to the method of Example 1. About 63 g. of 2-(4-amino-3,5-diiodobenzamido)- 4-methylpentanoic acid is obtained with the M. P. 204.5-206° C.

Example 4

(a) N-(p-nitrobenzoyl)-isoleucine is prepared from isoleucine (65.5 g.) and p-nitrobenzoyl chloride (93 g.) according to the method described in Example 1. About 108 g. of N-(p-nitrobenzoyl)-isoleucine is obtained with the M. P. 166-168° C.

(b) N-(p-aminobenzoyl)-isoleucine is prepared by reduction of the nitro compound (90 g.) in the manner described in Example 1. About 55 g. of N-(p-aminobenzoyl)-isoleucine is obtained with the M. P. 185° C.

(c) 2 - (4 - amino - 3,5-diiodobenzamido)-3-methylpentanoic acid is prepared by iodination of N - (p - aminobenzoyl) - isoleucine (54 g.) with iodine monochloride (27 cc., 81 g.) in the manner described in Example 1. About 70 g. of 2-(4-amino-3,5-diiodobenzamido)- 3-methylpentanoic acid is obtained with the M. P. 223-225° C.

Example 5

(a) 2-(p-nitrobenzamido) - heptanoic acid is prepared from alpha-aminoheptanoic acid (60 g.) and p-nitrobenzoyl chloride (76.3 g.) according to the method described in Example 1. About 92 g. of 2-(p-nitrobenzamido)-heptanoic acid is obtained with the M. P. 166-168° C.

(b) 2-(p-aminobenzamido)-heptanoic acid is prepared by reduction of the nitro compound (92 g. in 450 cc. of methanol) in the manner described in Example 1. About 69 g. of 2-(p-aminobenzamido)-heptanoic acid is obtained with the M. P. 159-160° C.

(c) 2 - (4 - amino-3,5-diiodobenzamido)-heptanoic acid is prepared by iodination of 2-(p-aminobenzamido)-heptanoic acid (69 g.) with iodine monochloride (30 cc., 89 g.) according to the method of Example 1. The final product, 2 - (4 - amino-3,5-diiodobenzamido) - heptanoic acid, melts at 159-166° C.

Example 6

(a) 2 - (p-nitrobenzamido)-5-methylhexanoic acid is prepared from 2-amino-5-methylhexanoic acid (67 g.) and p-nitrobenzoyl chloride (86 g.) according to the method described in Example 1. About 76 g. of 2-(p-nitrobenzamido)-5-methylhexanoic acid is obtained with the M. P. 197-198° C.

(b) 2-(p-aminobenzamido)- 5-methylhexanoic acid is prepared by reduction of the nitro compound (76 g. in 450 cc. of methanol) in the manner described in Example 1. About 44 g. of 2-(p-aminobenzamido)-5-methylhexanoic acid is obtained with the M. P. 187° C.

(c) 2 - (4 - amino-3,5 - diiodobenzamido)-5-methylhexanoic acid is prepared by iodination of 2 - (p-aminobenzamido)-5-methylhexanoic acid (43.5 g.) with iodine monochloride (18.9 cc., 56.7 g.) according to the manner described in Example 1. The product, 2-(4-amino-3,5-diiodobenzamido) - 5 - methylhexanoic acid, melts at 163.5-164.5° C.

Example 7

(a) N-(p-nitrobenzoyl)-phenylglycine is prepared from phenylglycine (118 g.) and p-nitrobenzoyl chloride (145 g.) according to the method described in Example 1. The N-(p-nitrobenzoyl)-phenylglycine so obtained has the M. P. 185–186° C.

(b) N-(p-aminobenzoyl)-phenylglycine is prepared by reduction of the nitro compound (56 g. in 450 cc. of methanol) by the method described in Example 1. The N-(p-aminobenzoyl)-phenylglycine so obtained is recrystallized from dilute ethanol and has the M. P. 134–135° C.

(c) N-(4-amino-3,5-diiodobenzoyl)-phenylglycine is prepared by iodination of N-(p-aminobenzoyl)-phenylglycine (12.4 g.) with iodine monochloride (5 cc.) in the manner described in Example 1. About 23 g. of crude product is obtained which after several recrystallizations from acetic acid gives about 8 g. of N-(4-amino-3,5-diiodobenzoyl)-phenylglycine, M. P. 224–225° C.

Example 8

(a) N-(p-nitrobenzoyl)-beta-phenylalanine is prepared from beta-phenylalanine (33 g.) and p-nitrobenzoyl chloride (40 g.) according to the method described in Example 1. About 50 g. of N-(p-nitrobenzoyl)-beta-phenylalanine is obtained with the M. P. 163–164° C.

(b) N-(p-aminobenzoyl)-beta-phenylalanine is prepared by reduction of the nitro compound (31.4 g. in 100 cc. of methanol) by the method described in Example 1. Recrystallization of the crude product from dilute alcohol gives about 22.7 g. of N-(p-aminobenzoyl)-beta-phenylalanine, M. P. 181° C.

(c) N-(4-amino-3,5-diiodobenzoyl)-beta-phenylalanine is prepared by iodination of N-(p-aminobenzoyl)-beta-phenylalanine (17 g.) with iodine monochloride (7.5 cc.) in the manner described in Example 1. Recrystallization of the crude product from dilute acetic acid gives about 24 g. of N-(4-amino-3,5-diiodobenzoyl)-beta-phenylalanine, M. P. 208–209° C.

Example 9

(a) Alpha-aminocyclopentaneacetic acid.—Sodium ethoxide is prepared from 34.5 g. of sodium and 750 cc. of absolute ethanol. To this solution is added 255 g. of ethyl acetamidocyanoacetate followed by 225 g. of cyclopentyl bromide added dropwise with stirring. After refluxing the mixture for seventeen hours, it is poured into ice-water, and the crude substituted ester is extracted with ether. The residue left after evaporation of the ether is saponified by refluxing with a solution of 350 g. of sodium hydroxide in 3500 cc. of water for a period of about sixteen hours. The solution is then cooled, brought to neutrality by the addition of hydrochloric acid and made distinctly acid with acetic acid, whereupon the amino acid precipitates and is filtered. The crude product is recrystallized by dissolving it in a minimum amount of dilute hydrochloric acid, clarifying the solution with activated charcoal, and adding pyridine gradually until precipitation of the amino acid is complete. In this way about 95 g. of alpha-aminocyclopentaneacetic acid is obtained with a melting point greater than 220° C.

(b) N-(p-nitrobenzoyl)-alpha-aminocyclopentaneacetic acid is prepared from alpha-aminocyclopentaneacetic acid (59.5 g.) and p-nitrobenzoyl chloride (83 g.) according to the method described in Example 1. About 120 g. of N-(p-nitrobenzoyl)-alpha-aminocyclopentaneacetic acid is obtained with the M. P. 205–207° C.

(c) N-(p-aminobenzoyl)-alpha-aminocyclopentaneacetic acid is prepared by reduction of the nitro compound (87 g. in 450 cc. of methanol) by the method described in Example 1. The N-(p-aminobenzoyl)-alpha-aminocyclopentaneacetic acid so obtained is recrystallized from ethanol and has the M. P. 223° C.

(d) N-(4-amino-3,5-diiodobenzoyl-alpha-aminocyclopentaneacetic acid is prepared by iodination of N-(p-aminobenzoyl)-alpha-aminocyclopentaneacetic acid (54.9 g.) with iodine monochloride (22.3 cc.) in the manner described in Example 1. Recrystallization of the crude product from dilute ethanol gives about 62 g. of N-(4-amino-3,5-diiodobenzoyl)-alpha-aminocyclopentaneacetic acid with the M. P. 210–211° C.

The amino acids used in the above examples are representative, but do not constitute a limit to my invention. Other amino acids which may be used for the synthesis of contrast agents include, for example, anthranilic acid, p-aminobenzoic acid, 3-aminohexanoic acid, 3-aminoheptanoic acid, 7-aminoheptanoic acid and 8-aminooctanoic acid.

If the radiopaque media of my invention are desired in water soluble form, the N-(4-amino-3,5-diiodobenzoyl)-amino acids may be converted to their carboxylic acid salts by the addition of an equivalent amount of a strong inorganic base, such as sodium or potassium hydroxide, or certain therapeutically acceptable organic bases, such as diethylamine or diethanolamine.

I claim:

1. The process for preparing a compound of the formula

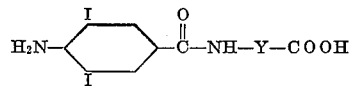

where Y is a hydrocarbon bridge having from 5 to 8 carbon atoms which comprises reacting a p-nitrobenzoyl halide with an amino acid of the formula, $H_2N$—Y—COOH, reducing the resulting p-nitrobenzoylamino acid to the amino compound of the formula

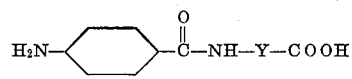

and reacting the latter with an iodinating agent.

2. The process for preparing a compound of the formula

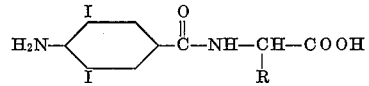

where R is a hydrocarbon group having from 4 to 7 carbon atoms which comprises reacting a p-nitrobenzoyl halide with an amino acid of the formula, $H_2N$—CH(R)—COOH, reducing the resulting p-nitrobenzoylamino acid to the amino compound of the formula

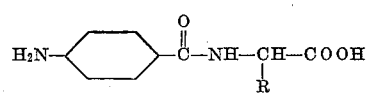

and reacting the latter with an iodinating agent.

3. The process for preparing a compound of the formula

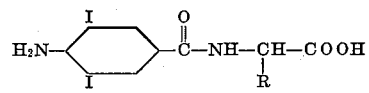

where R is an alkyl group having from 4 to 7 carbon atoms which comprises reacting a p-nitrobenzoyl halide with an amino acid of the formula, H₂N—CH(R)—COOH, reducing the resulting p-nitrobenzoylamino acid to the amino compound of the formula

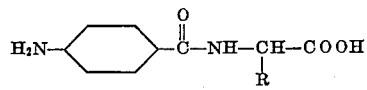

and reacting the latter with an iodinating agent.

SYDNEY ARCHER.

REFERENCES CITED

The following references are of record in the file of this patent:

UNITED STATES PATENTS

| Number | Name | Date |
| --- | --- | --- |
| 2,116,104 | Dohrn et al. | May 3, 1938 |
| 2,160,413 | Dohrn et al. | May 30, 1939 |
| 2,345,384 | Dohrn et al. | Mar. 28, 1944 |
| 2,400,433 | Natelson et al. | May 14, 1946 |

FOREIGN PATENTS

| Number | Country | Date |
| --- | --- | --- |
| 522,788 | Germany | Apr. 15, 1931 |
| 517,382 | Great Britain | July 25, 1939 |